US010247387B2

(12) United States Patent
Nishino et al.

(10) Patent No.: US 10,247,387 B2
(45) Date of Patent: Apr. 2, 2019

(54) ILLUMINATION DEVICE SYSTEM

(71) Applicant: Olympus Corporation, Hachioji-shi, Tokyo (JP)

(72) Inventors: Toshiki Nishino, Mitaka (JP); Mitsuhiro Haga, Hanno (JP); Hidehiro Takao, Fukuyama (JP)

(73) Assignee: Olympus Corporation, Tokyo (JP)

( * ) Notice: Subject to any disclaimer, the term of this patent is extended or adjusted under 35 U.S.C. 154(b) by 90 days.

(21) Appl. No.: 15/642,327

(22) Filed: Jul. 5, 2017

(65) Prior Publication Data

US 2018/0010774 A1      Jan. 11, 2018

(30) Foreign Application Priority Data

Jul. 7, 2016   (JP) ................. 2016-135450

(51) Int. Cl.
| | | |
|---|---|---|
| *F21V 14/08* | (2006.01) | |
| *F21S 9/02* | (2006.01) | |
| *F21V 23/00* | (2015.01) | |
| *F21V 33/00* | (2006.01) | |
| *G03B 15/00* | (2006.01) | |

(52) U.S. Cl.
CPC .............. *F21V 14/08* (2013.01); *F21S 9/02* (2013.01); *F21V 23/001* (2013.01); *F21V 33/0052* (2013.01); *G03B 15/00* (2013.01)

(58) Field of Classification Search
CPC .... F21V 14/08; F21V 33/0052; F21V 23/001; G03B 15/00; G03B 15/06; F21S 9/02
See application file for complete search history.

(56) References Cited

U.S. PATENT DOCUMENTS

| | | | | |
|---|---|---|---|---|
| 2,719,281 | A * | 9/1955 | Roth | B60Q 1/2611 340/331 |
| 8,025,426 | B2 * | 9/2011 | Mundle | F21V 7/0016 362/281 |
| 2006/0034079 | A1 * | 2/2006 | Schnuckle | B44C 5/06 362/253 |
| 2008/0137347 | A1 * | 6/2008 | Trott | F21S 8/02 362/311.06 |
| 2015/0092422 | A1 * | 4/2015 | Jurik | F21S 10/00 362/307 |

FOREIGN PATENT DOCUMENTS

| | | |
|---|---|---|
| JP | H02-001738 U | 1/1990 |
| JP | 5526533 | 4/2014 |

* cited by examiner

*Primary Examiner* — Anh T Mai
*Assistant Examiner* — Glenn D Zimmerman
(74) *Attorney, Agent, or Firm* — John C. Pokotylo; Pokotylo Patent Services

(57) ABSTRACT

An illumination device system includes: an illumination device including an engaging portion configured to engage with an illumination device support base, a main body portion, a light emitting portion configured to swing around a turning axis in relation to the main body portion, and a cable extending from the main body portion; and a diffuser, and the diffuser swings around the turning axis between an advanced position positioned in front of the light emitting portion and a withdrawn position withdrawn from the front of the light emitting portion, and includes a first locking portion configured to engage with the illumination device support base and holds the diffuser at the advanced position, and a second locking portion configured to engage with the cable and holds the diffuser at the withdrawn position.

20 Claims, 11 Drawing Sheets

# ILLUMINATION DEVICE SYSTEM

CROSS REFERENCE TO RELATED APPLICATION

This application claims the benefit of Japanese Application No. 2016-135450 filed in Japan on Jul. 7, 2016, the contents of which are incorporated herein by this reference.

BACKGROUND OF THE INVENTION

1. Field of the Invention

The present invention relates to an illumination device system used together with an image pickup apparatus.

2. Description of the Related Art

During photographing by an image pickup apparatus such as a camera or a video camera, an illumination device configured to emit light for illuminating an object is sometimes used. In a case of performing photographing by the image pickup apparatus using the illumination device, a diffuser configured to diffuse the light emitted from the illumination device is sometimes used as disclosed in Japanese Patent No. 5526533 and Japanese Utility Model Application Laid-Open Publication No. 2-1738 for example.

SUMMARY OF THE INVENTION

An illumination device system according to one aspect of the present invention includes: an illumination device support base including an accessory shoe; and an illumination device including an engaging portion configured to engage with the accessory shoe, a main body portion to which the engaging portion is fixed, a swing portion capable of swinging around a turning axis in relation to the main body portion, a light emitting portion provided in the swing portion, a cable extending from the main body portion, and a diffuser, the diffuser is turnable relative to the main body portion around the turning axis, one end of a range of the turning is an advanced position where the diffuser is positioned in front of the light emitting portion, another end of the range of the turning is a withdrawn position where the diffuser is withdrawn from the front of the light emitting portion, and the diffuser is provided with a first locking portion configured to engage with the illumination device support base and stop the turning of the diffuser in a case that the diffuser is at the advanced position, and a second locking portion configured to engage with the cable and stop the turning of the diffuser in a case that the diffuser is at the withdrawn position.

An illumination device system according to another aspect of the present invention includes: an illumination device including a main body portion, a swing portion capable of swinging around a turning axis in relation to the main body portion, a light emitting portion provided in the swing portion, and a cable extending from the main body portion; and a diffuser turnable relative to the main body portion around the turning axis, wherein one end of a range of the turning is an advanced position positioned in front of the light emitting portion and another end of the range of the turning can be positioned at a withdrawn position withdrawn from the front of the light emitting portion, and including a first locking portion configured to engage with an illumination device support base supporting the illumination device and stop the turning in a case of being at the advanced position, and a second locking portion configured to engage with the cable and stop the turning of the diffuser in a case of being at the withdrawn position.

An illumination device system according to another aspect of the present invention includes: an illumination device including an engaging portion configured to engage with an accessory shoe provided in an illumination device support base, a main body portion to which the engaging portion is fixed, a swing portion capable of swinging around a turning axis in relation to the main body portion, a light emitting portion provided in the swing portion, and a cable extending from the main body portion; and a diffuser turnable relative to the main body portion around the turning axis, wherein one end of a range of the turning is an advanced position positioned in front of the light emitting portion and another end of the range of the turning can be positioned at a withdrawn position withdrawn from the front of the light emitting portion, including a first locking portion configured to engage with the illumination device support base and stop the turning in a case of being at the advanced position, and a second locking portion configured to engage with the cable and stop the turning of the diffuser in a case of being at the withdrawn position, and attachable and detachable to/from the illumination device.

DETAILED DESCRIPTION OF THE PREFERRED EMBODIMENT

Figure 1:
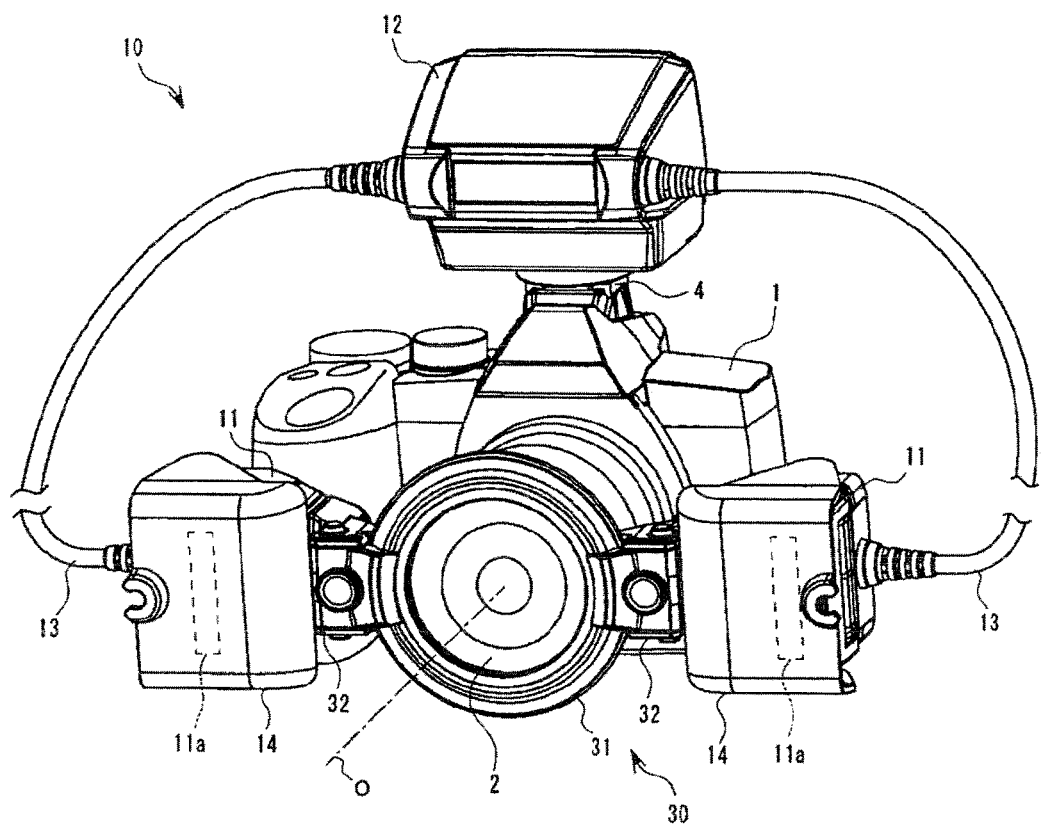
FIG. 1 is a perspective view of an illumination device system and an image pickup apparatus.

Hereinafter, the preferred embodiment of the present invention will be described with reference to the drawings. Note that, in the respective drawings used in following description, a scale is made different for each component in order to turn the individual components to such sizes that the components can be recognized on the drawings, and the present invention is not limited only to quantities of the components, shapes of the components, ratios of the sizes of the components, and relative positional relationships of the individual components described in the drawings.

FIG. 1 is a perspective view of an illumination device system 10 and an image pickup apparatus 1. In the following description, a direction from a lens 2 to an object along an optical axis O of the lens 2 of the image pickup apparatus 1 is called front, and a direction opposite to the direction is called rear. The illumination device system 10 is attachable and detachable to/from the image pickup apparatus 1 or the lens 2 as described later, and it is assumed that the direction of each configuration of the illumination device system 10 in the following description indicates the direction in a state that the illumination device system 10 is mounted on the image pickup apparatus 1 or the lens 2, as illustrated in FIG. 1. That is, the front of a member configuring the illumination device system 10 is the direction from the lens 2 to the object along the optical axis O of the lens 2 in the state that the illumination device system 10 is mounted on the image pickup apparatus 1 or the lens 2, as illustrated in FIG. 1.

The illumination device system 10 of the present embodiment holds one or a plurality of illumination devices 11 near a front side end portion of the lens 2 of the image pickup apparatus 1, as illustrated in FIG. 1. Note that the lens 2 may be in a form attachable and detachable to/from the image pickup apparatus 1 or in a form of being incorporated inside the image pickup apparatus 1.

The image pickup apparatus 1 or the lens 2 includes a female screw portion (not shown in the figure). The optical axis O of the lens 2 passes through an inside of the female screw portion. A center of a female screw portion roughly coincides with the optical axis O of the lens 2. The female screw portion is for attaching a filter or a conversion lens or the like, and is generally used in a technical field of the image pickup apparatus.

In addition, in the present embodiment, as one example, the image pickup apparatus 1 is provided with an accessory shoe 4. The accessory shoe 4 is a portion configured to fix an external device such as a flash device to the image pickup apparatus 1 in an attachable/detachable state. The accessory shoe 4 of the present embodiment has a standardized shape widely used in a field of the image pickup apparatus 1, and an engaging portion provided in the external device is fitted.

The illumination device system 10 includes one or a plurality of illumination devices 11, and an adaptor system for supporting the illumination device (simply referred to as "adaptor system", hereinafter) 30. Note that the illumination device system 10 includes the two illumination devices 11 as one example in the illustrated present embodiment, however, a number of the illumination devices 11 provided in the illumination device system 10 may be changeable.

Schematically, the illumination device system 10 holds one or a plurality of illumination devices 11 in front or at an outer peripheral portion of the lens 2, using the female screw portion provided on the image pickup apparatus 1 or the lens 2.

The illumination device 11 includes a light emitting portion 11a configured to emit light. The light emitting portion 11a may be a flash using a xenon tube or maybe an LED. In the present embodiment, as one example, the light emitting portion 11a is the flash.

A light emitting operation of the illumination device 11 is controlled by a power source device 12 as one example in the present embodiment. The illumination device 11 and the power source device 12 are electrically connected through a cable 13.

The power source device 12 is attachable and detachable to/from the accessory shoe 4 of the image pickup apparatus 1. The power source device 12 controls the light emitting operation of the illumination device 11 according to an operation of the image pickup apparatus 1 in the state of being attached to the accessory shoe 4.

In addition, the power source device 12 stores a battery which is a primary battery or a secondary battery, and supplies power of the battery through the cable 13 to the illumination device 11. That is, the cable 13 is a configuration for the illumination device 11 to receive power supply.

Note that the illumination device 11 may be in a form of being electrically connected through the cable 13 to the image pickup apparatus 1. In this case, control of the light emitting operation of the illumination device 11 and the power supply to the illumination device 11 are performed by the image pickup apparatus 1.

Figure 2:
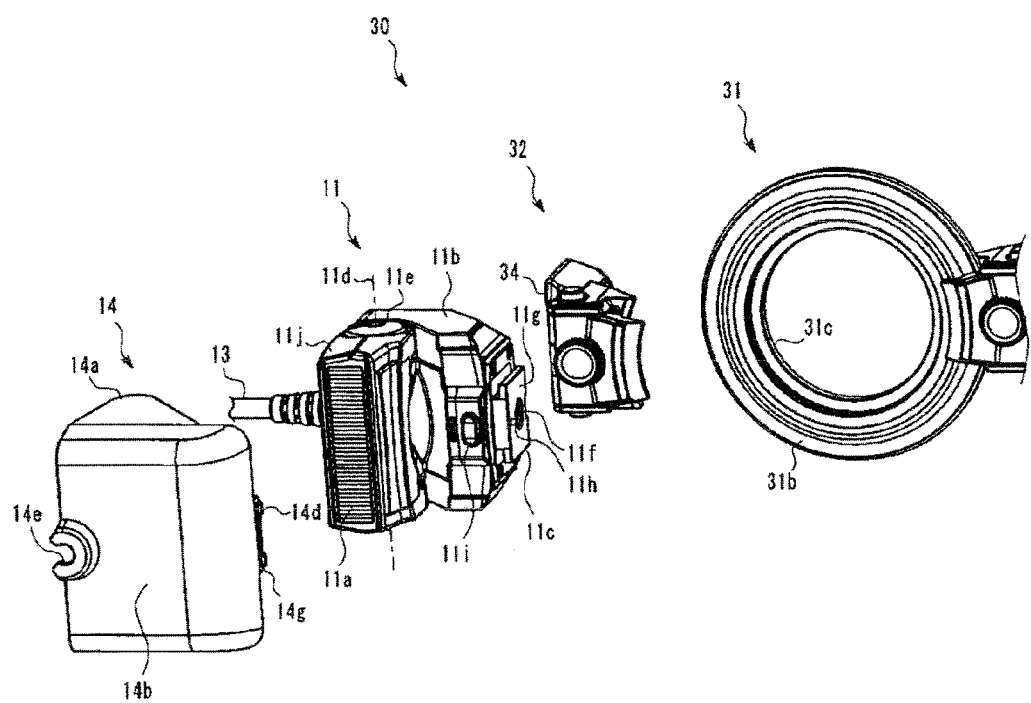
FIG. 2 is a diagram separately illustrating a configuration separable by an operation by a user of the illumination device system.

FIG. 2 is a diagram separately illustrating a configuration separable by an operation by a user of the illumination device system 10. As illustrated in FIG. 2, the illumination device 11 includes a main body portion 11b provided with an engaging portion 11c. The engaging portion 11c is a portion that engages with an accessory shoe 34 provided in an illumination device support base 32 to be described later. That is, the main body portion 11b is a portion fixed to the illumination device support base 32 through the engaging portion 11c.

In the present embodiment, as one example, the engaging portion 11c has a shape that can engage also with the accessory shoe 4. That is, the accessory shoe 4 and the accessory shoe 34 provided in the illumination device support base 32 are in an almost same shape. Therefore, the illumination device 11 can be fixed to a commercially available bracket or the like for supporting the image pickup apparatus 1 or the flash device through the engaging portion 11c without using the adaptor system 30.

Note that, in the present embodiment, the accessory shoe 34 provided in the illumination device support base 32 is arranged so as to insert the engaging portion 11c from the front. Therefore, even in the state that the illumination device system 10 is fixed to the female screw portion, the illumination device 11 can be attached and detached.

In addition, on a bottom surface 11g of the engaging portion 11c of the illumination device 11, a screw hole 11f which is a female screw is provided. The screw hole 11f has a same nominal diameter as the nominal diameter of a male screw used in a universal head of a tripod or the like. That is, the illumination device 11 can be fixed also to the commercially available universal head or the like.

In addition, from the bottom surface 11g of the engaging portion 11c, a falling prevention pin 11h is projected. The falling prevention pin 11h engages with a falling prevention hole 34a provided in the accessory shoe 34, and prevents falling of the illumination device 11 from the accessory shoe 34. The falling prevention pin 11h is withdrawn into the engaging portion 11c in the case that a release button 11i provided in the main body portion 11b is depressed. In the state that the falling prevention pin 11h is withdrawn into the engaging portion 11c, the engaging portion 11c can be pulled out from the accessory shoe 34.

The illumination device 11 includes a swing portion 11j configured to relatively turn (swing) around a turning axis 11d to the main body portion 11b. In the swing portion 11j, the light emitting portion 11a is arranged. That is, the illumination device 11 includes a swing mechanism configured to relatively turn the light emitting portion 11a around the turning axis 11d. Therefore, the illumination device 11 can change an emitting direction of the light emitted by the light emitting portion 11a even in the state that the main body portion 11b is fixed.

Figure 3:
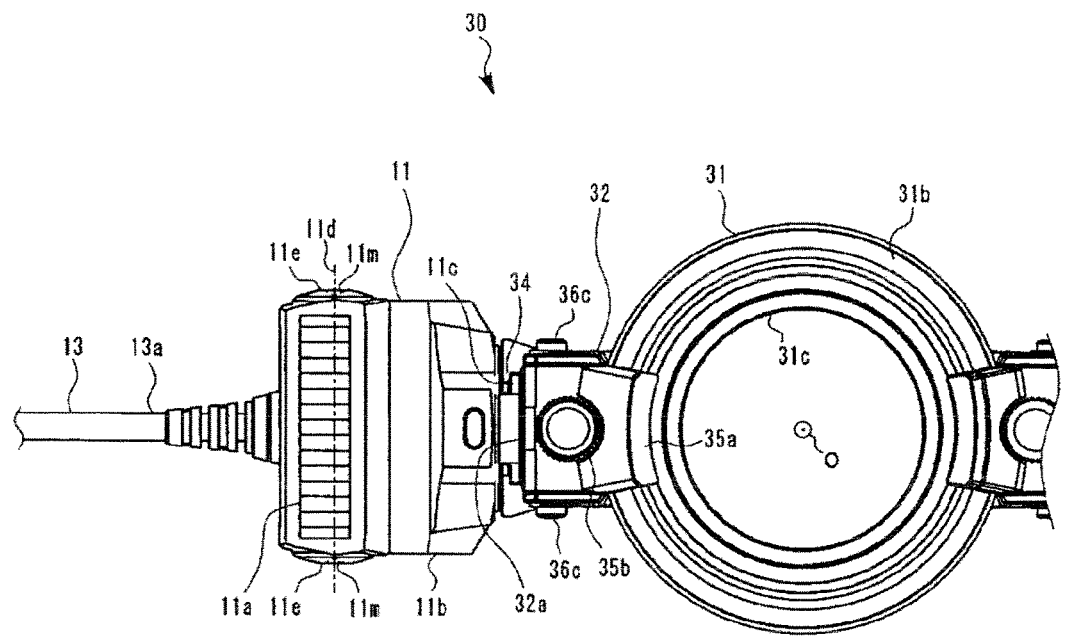
FIG. 3 is a diagram viewing the illumination device system from front.
Figure 4:
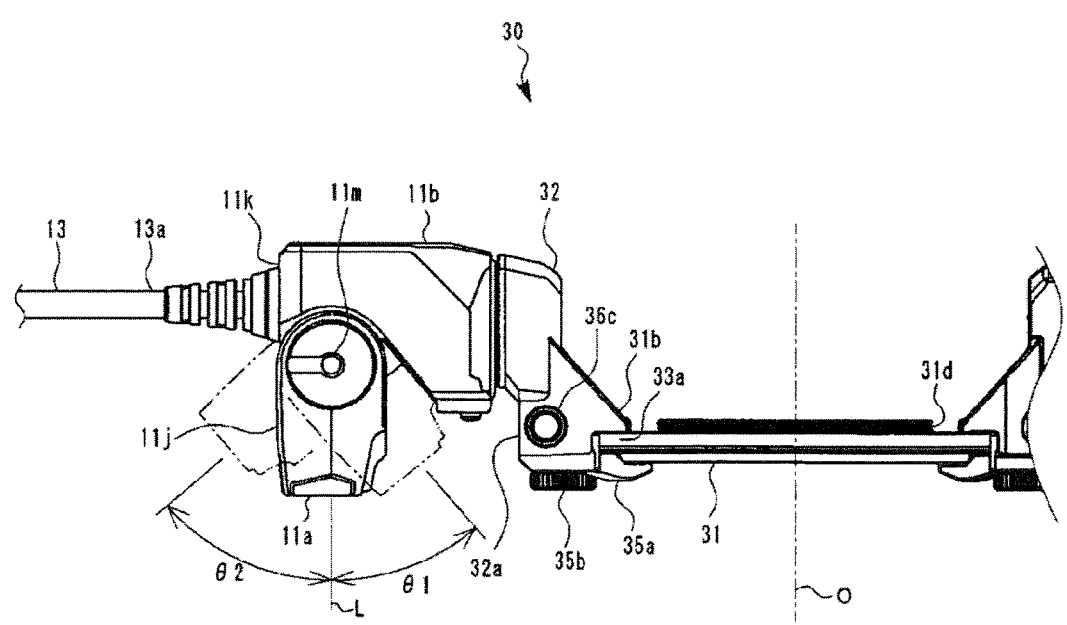
FIG. 4 is a diagram viewing the illumination device system from a direction along a turning axis of an illumination device.

FIG. 3 is a diagram viewing the illumination device system 10 from the front. FIG. 4 is a diagram viewing the illumination device system 10 from a direction along the turning axis 11d of the illumination device 11.

In the state that the illumination device 11 is fixed to the female screw portion of the image pickup apparatus 1 or the lens 2 through the adaptor system 30, the turning axis 11d becomes parallel with a tangent of a circle centering on the optical axis O, on a plane orthogonal to the optical axis of the lens 2. That is, the turning axis 11d is orthogonal to a straight line passing through the optical axis of the lens 2 on the plane orthogonal to the optical axis O of the lens 2. In addition, the turning axis 11d is arranged at a position farther from the optical axis than the engaging portion 11c, in the state that the illumination device 11 is fixed to the female screw portion of the image pickup apparatus 1 or the lens 2 through the adaptor system 30.

As illustrated in FIG. 4, the swing mechanism can turn the light emitting portion 11a between a posture that a center axis L of a luminous flux emitted by the light emitting portion 11a approaches the optical axis O as turning to the front and a posture that the center axis L of the luminous flux emitted by the light emitting portion 11a separates from the optical axis O as turning to the front. In FIG. 4, the light emitting portion 11a illustrated with a solid line is positioned at a position at which the center axis L of the luminous flux emitted by the light emitting portion 11a is roughly parallel with the optical axis O. Then, in FIG. 4, in the case that the light emitting portion 11a is within a range indicated by θ1, the center axis L of the luminous flux emitted by the light emitting portion 11a approaches the optical axis O as turning to the front. In addition, in FIG. 4, in the case that the light emitting portion 11a is within a range indicated by θ2, the center axis L of the luminous flux emitted by the light emitting portion 11a separates from the optical axis O as turning to the front. In this way, the illumination device 11 can change the emitting direction of the light emitted by the light emitting portion 11a according to a change of a distance from the lens 2 to an object and need of a bounce of illumination light.

The cable 13 extends from the main body portion 11b. A base portion 13a of the cable 13 is fixed to a distal end portion 11k which is an end portion on an opposite side of the engaging portion 11c of the main body portion 11b. The distal end portion 11k is an end portion in a direction of separating from the optical axis of the main body portion 11b in the state that the illumination device 11 is fixed to the female screw portion of the image pickup apparatus 1 or the lens 2 through the adaptor system 30. In the case of viewing from the front, the distal end portion 11k is arranged at a position separated from the optical axis O more than the turning axis 11d.

In the state that the illumination device 11 is fixed to the female screw portion of the image pickup apparatus 1 or the lens 2 through the adaptor system 30, a vicinity of the base portion 13a of the cable 13 extends from the distal end portion 11k of the main body portion 11b in a direction of separating from the optical axis O roughly in parallel with a straight line orthogonal to the optical axis O. Note that, since the cable 13 is flexible, a direction in which the portion away from the base portion 13a of the cable 13 extends is variable and indefinite.

In addition, the illumination device 11 can be mounted with a diffuser 14 configured to diffuse the light emitted by the light emitting portion 11a. The diffuser 14 and a configuration of mounting the diffuser 14 on the illumination device 11 will be described later.

The adaptor system 30 includes an adaptor for supporting the illumination device (simply referred to as "adaptor", hereinafter) 31, and the illumination device support base (simply referred to as "support base", hereinafter) 32.

Figure 5:
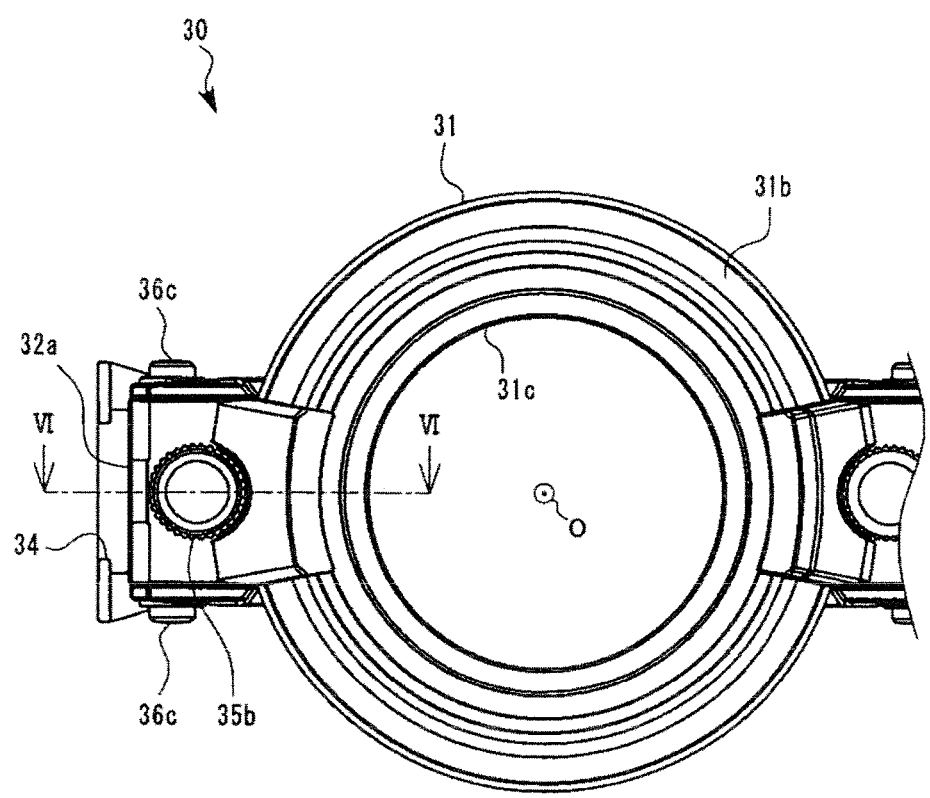
FIG. 5 is a diagram viewing an adaptor system for supporting the illumination device from the front.
Figure 6:
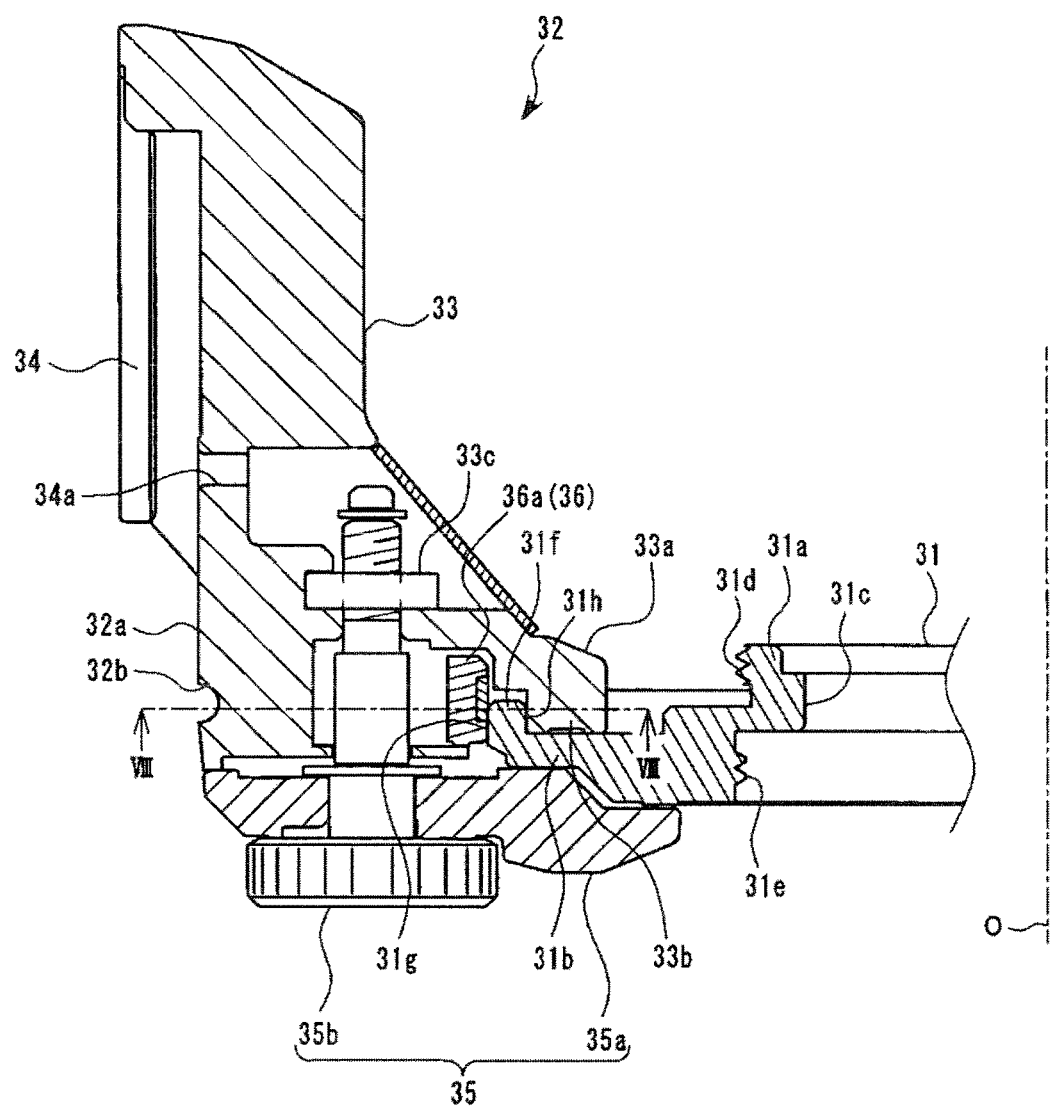
FIG. 6 is a VI-VI sectional view of FIG. 5.
Figure 7:
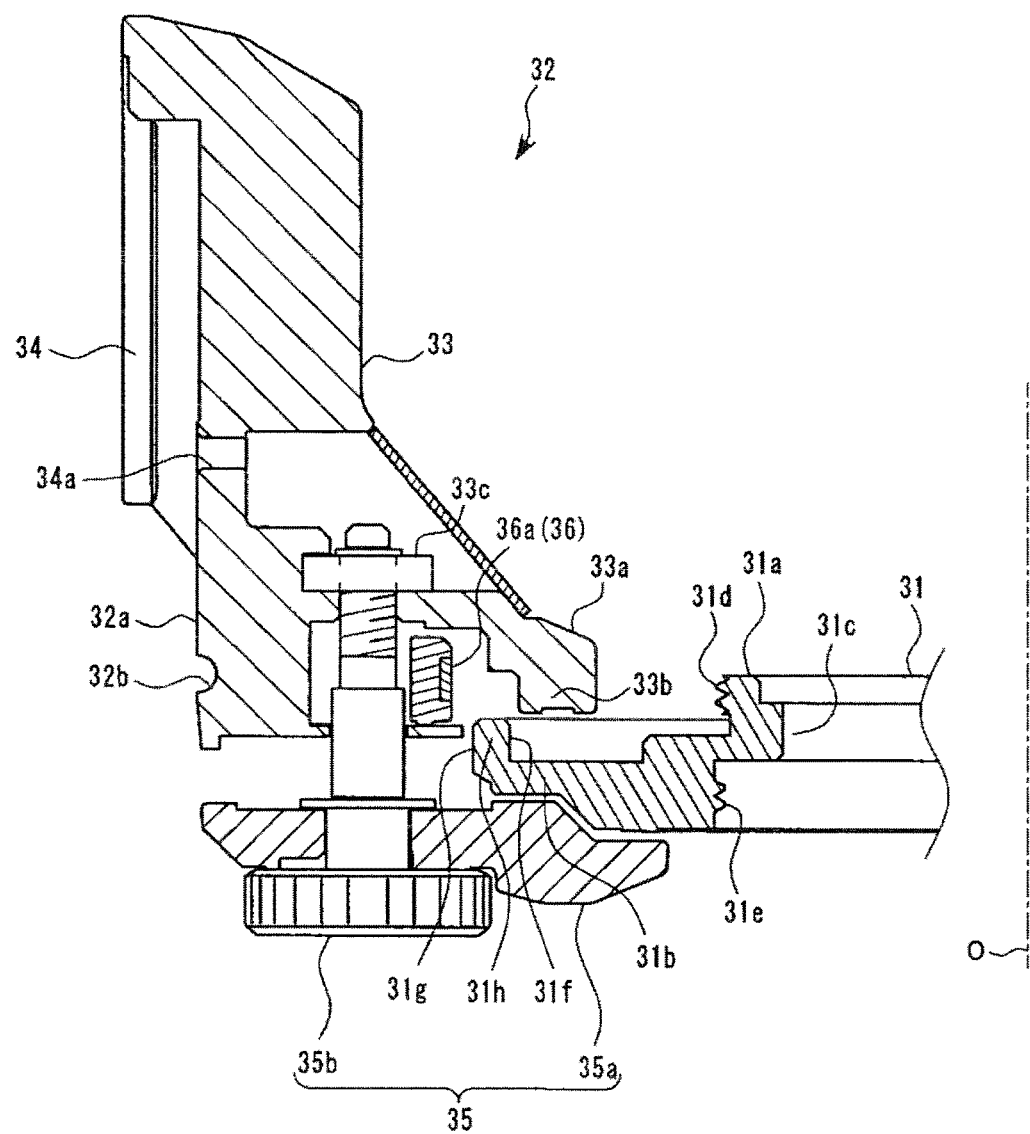
FIG. 7 is a diagram illustrating a state of releasing engagement of an adaptor for supporting the illumination device and an illumination device support base, on a cross section illustrated in FIG. 6.
Figure 8:
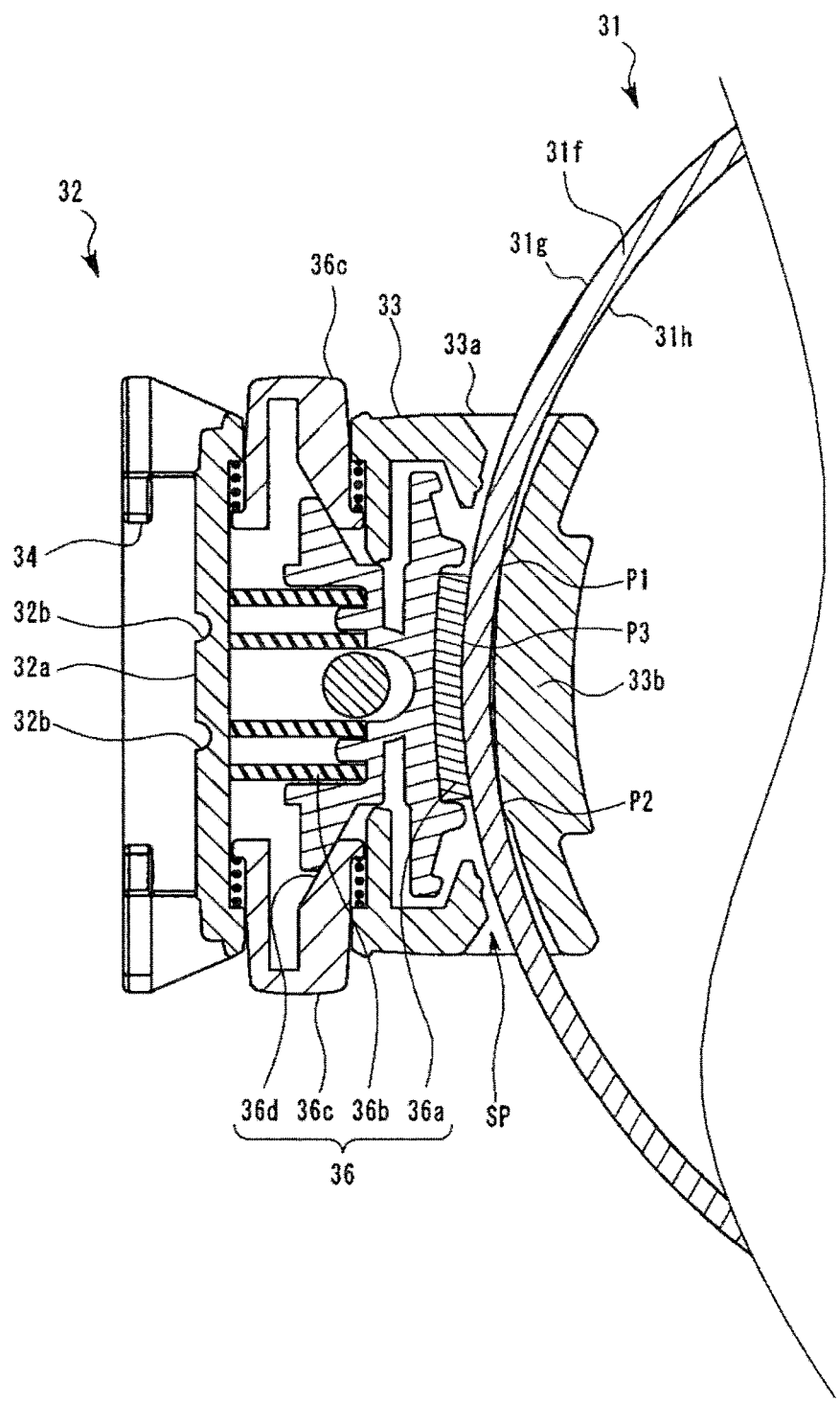
FIG. 8 is a VIII-VIII sectional view of FIG. 6.
Figure 9:
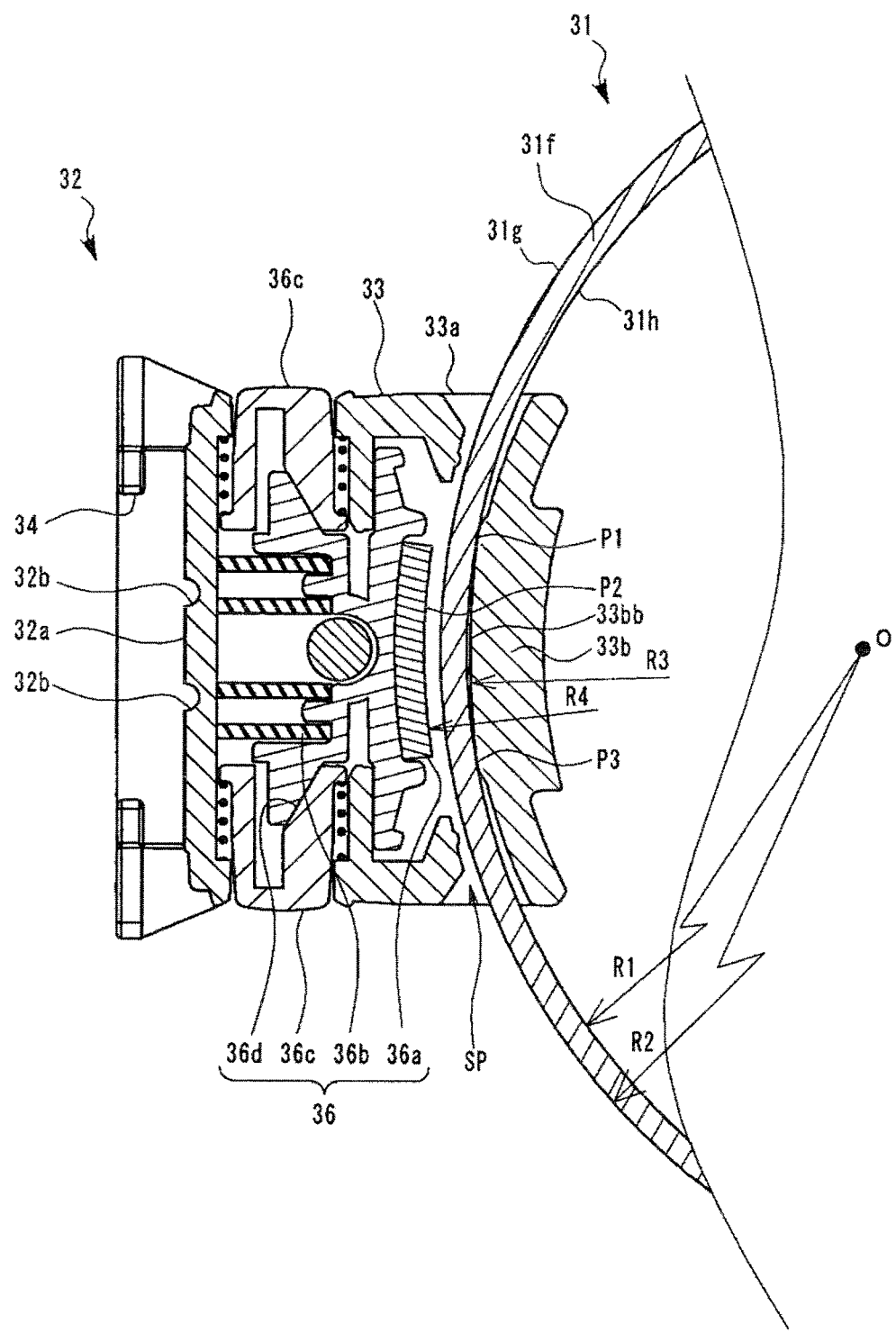
FIG. 9 is a diagram illustrating a state of releasing fixation by a position fixing mechanism portion, on a cross section illustrated in FIG. 8.

FIG. 5 is a diagram viewing the adaptor system 30 from the front. FIG. 6 is a VI-VI sectional view of FIG. 5. FIG. 7 is a diagram illustrating the state of releasing engagement of the adaptor 31 and the support base 32, on a cross section illustrated in FIG. 6. FIG. 8 is a VIII-VIII sectional view of FIG. 6. FIG. 9 is a diagram illustrating the state of releasing fixation by a position fixing mechanism portion 36, on a cross section illustrated in FIG. 8.

Schematically, the adaptor 31 is a member that includes a male screw portion 31d to be screwed to the female screw portion of the image pickup apparatus 1 or the lens 2, and is fixable at a predetermined position to the lens 2. In the present embodiment, the adaptor 31 is fixed to the front of the lens 2, that is, the front of a lens barrel. In addition, schematically, the support base 32 is a member that is fixable to the adaptor 31, and includes the accessory shoe 34 with which the engaging portion 11c of the illumination device 11 engages.

The adaptor 31 includes a cylindrical portion 31a in a cylindrical shape, and a planar flange portion 31b projected from an outer periphery of the cylindrical portion 31a to an outer side. The cylindrical portion 31a is in the cylindrical shape opened at both ends. That is, at the cylindrical portion 31a, an opening 31c which is a through-hole is formed.

Furthermore, on the outer periphery of one end portion of the cylindrical portion 31a, the male screw portion 31d is formed. The male screw portion 31d has a shape to be screwed to the female screw portion provided in the image pickup apparatus 1 or the lens 2. That is, the male screw portion 31d has the same nominal diameter as the nominal diameter of the female screw portion.

The center axis of the male screw portion 31d and the center axis of the opening 31c roughly coincide. Note that the center axis of the male screw portion 31d is a rotation axis of the male screw portion 31d to be rotated when the male screw portion 31d is screwed to the female screw portion. In addition, in the present embodiment, the opening 31c is a linear through-hole, a sectional shape of which orthogonal to the optical axis O is circular, and the center axis is a straight line passing through the center of the opening 31c in a columnar shape. The center axis of the male screw portion 31d in the state of being screwed to the female screw portion roughly coincides with the optical axis O of the lens 2.

Hereinafter, a direction along the center axis of the male screw portion 31d in the adaptor 31 is referred to as a thickness direction. In addition, an end on the side where the male screw portion 31d is formed of the cylindrical portion 31a is referred to as a first end (rear end). Furthermore, an end on the side where the male screw portion 31d is not formed of the cylindrical portion 31a is referred to as a second end (front end). In the state that the male screw portion 31d is screwed to the female screw portion, the cylindrical portion 31a is in such a posture that the first end turns to the side of the image pickup apparatus 1 (rear) and the second end turns to an object side (front) of the image pickup apparatus 1. In the state that the male screw portion 31*d* is screwed to the female screw portion, the image pickup apparatus 1 can pick up an image of the object through the opening 31*c*.

In addition, in the present embodiment, as one example, a female screw portion 31*e* is formed on an inner peripheral surface of the second end of the cylindrical portion 31*a*. The female screw portion 31*e* has the same nominal diameter as the nominal diameter of the female screw portion provided in the image pickup apparatus 1 or the lens 2. Therefore, to the female screw portion 31*e*, a filter or a conversion lens or the like mountable on the female screw portion provided in the image pickup apparatus 1 or the lens 2 can be attached as it is.

The flange portion 31*b* is a planar portion projected to the outer side more than an outer diameter of the male screw portion 31*d* at a position closer to the second end than the male screw portion 31*d*. In the present embodiment, as one example, the flange portion 31*b* extends in the direction roughly orthogonal to the center axis of the male screw portion 31*d* by a predetermined distance from the outer periphery of the cylindrical portion 31*a*, and the flange portion 31*b* is formed over an entire circumferential direction of the outer periphery of the cylindrical portion 31*a*. That is, the flange portion 31*b* is the planar portion along a plane roughly orthogonal to the center axis of the male screw portion 31*d*. In addition, in the case of viewing from the direction along the center axis of the male screw portion 31*d* (thickness direction), the shape of the flange portion 31*b* is circular. Then, in the case of viewing from the thickness direction, the center of the circle along the outer periphery of the flange portion 31*b* coincides with the center axis of the male screw portion 31*d*.

In addition, an outer peripheral surface of the flange portion 31*b* is roughly parallel with the center axis of the male screw portion 31*d*. That is, the outer peripheral surface of the flange portion 31*b* is a columnar surface centering on the center axis of the male screw portion 31*d*.

The flange portion 31*b* is provided with a locking portion 31*f*. The locking portion 31*f* is a portion with which a holding portion 33 provided in the support base 32 to be described later engages.

Specifically, the locking portion 31*f* is a wall-shaped portion projected in the thickness direction from at least one of the surface turning to a first end side of the flange portion 31*b* and the surface turning to a second end side of the flange portion 31*b*.

In the present embodiment, as one example, the locking portion 31*f* is continuously formed in the entire circumferential direction along the circle centering on the center axis of the male screw portion 31*d*. That is, the locking portion 31*f* of the present embodiment is in the cylindrical shape centering on the center axis of the male screw portion 31*d*.

More specifically, the locking portion 31*f* of the present embodiment stands erect toward the first end side from the surface turning to the first end side of the flange portion 31*b*. A diameter of an outer peripheral surface 31*g* of the locking portion 31*f* in the cylindrical shape is the same as a diameter of the flange portion 31*b*.

The support base 32 includes the holding portion 33 and the accessory shoe 34. The holding portion 33 includes the configuration of fixing the support base 32 to the adaptor 31. In addition, the accessory shoe 34 includes the configuration that the engaging portion 11*c* of the illumination device 11 engages as described above.

The configuration of the holding portion 33 is not limited in particular as long as the configuration is attachable and detachable to/from the adaptor 31 and fixes the accessory shoe 34 to the adaptor 31. For example, the holding portion 33 may be a clamp-like configuration of holding the flange portion 31*b* of the adaptor 31 in the thickness direction by tightening force of a screw, or may be the clamp-like configuration of holding the flange portion 31*b* of the adaptor 31 in the thickness direction by elastic force of a spring.

The holding portion 33 of the present embodiment includes, as one example, a base portion 33*a* to which the accessory shoe 34 is fixed, a falling prevention mechanism portion 35 that holds the flange portion 31*b* of the adaptor 31 with the base portion 33*a* in the thickness direction, and the position fixing mechanism portion 36 that holds the locking portion 31*f* of the adaptor 31 with the base portion 33*a* in the direction orthogonal to the center axis of the male screw portion 31*d*. In other words, the falling prevention mechanism portion 35 holds the flange portion 31*b* with the base portion 33*a* in the direction along the optical axis O (parallel with the optical axis), and the position fixing mechanism portion 36 holds the locking portion 31*f* with the base portion 33*a* in the direction orthogonal to the optical axis O.

The falling prevention mechanism portion 35 prevents falling from the adaptor 31 of the holding portion 33, while making the holding portion 33 relatively turnable around the center axis of the male screw portion 31*d* to the adaptor 31. In addition, the position fixing mechanism portion 36 fixes the holding portion 33 to be relatively turnable in relation to the adaptor 31 at an arbitrary position in a turning direction around the center axis of the male screw portion 31*d*.

The base portion 33*a* is provided with a contact portion 33*b* to be in contact with an inner peripheral surface 31*h* of the locking portion 31*f* of the adaptor 31.

The falling prevention mechanism portion 35 includes a movable member 35*a* and a bolt 35*b*. The bolt 35*b* passes through the movable member 35*a* and is screwed to a nut 33*c* fixed to the base portion 33*a*. The movable member 35*a* is moved forward and backward in the direction parallel with the optical axis O together with the bolt 35*b*, according to relative rotation to the nut 33*c* of the bolt 35*b*.

By the movable member 35*a* moving forward and backward, a separation distance between the movable member 35*a* and the contact portion 33*b* of the base portion 33*a* is changed. FIG. 6 illustrates the state of fastening the bolt 35*b* and bringing the movable member 35*a* closest to the contact portion 33*b*, and FIG. 7 illustrates the state of loosening the bolt 35*b* and separating the movable member 35*a* most from the contact portion 33*b*.

The movable member 35*a* holds the flange portion 31*b* with the contact portion 33*b* in parallel with the optical axis O, in the state of being brought closest to the contact portion 33*b* by fastening of the bolt 35*b*.

In the case of fastening the bolt 35*b* without holding the flange portion 31*b* in between, in the state that the movable member 35*a* is closest to the contact portion 33*b*, the separation distance between the movable member 35*a* and the contact portion 33*b* is shorter (narrower) than a thickness in the thickness direction of the flange portion 31*b*.

Therefore, in the state that the movable member 35*a* is closest to the contact portion 33*b* and an area (flange portion 31*b*) closer to the center axis of the male screw portion 31*d* than the locking portion 31*f* of the flange portion 31*b* is loosely held between the movable member 35*a* and the contact portion 33*b*, the holding portion 33 is relatively turnable around the center axis of the male screw portion 31*d* to the adaptor 31, and also the holding portion 33 is prevented from falling from the adaptor 31 by the falling prevention mechanism portion 35 engaging with the locking portion 31*f*.

The position fixing mechanism portion 36 includes a pressurizing member 36*a* and a spring member 36*b*.

The pressurizing member 36*a* is in contact with the outer peripheral surface 31*g* of the locking portion 31*f* in the state that the falling prevention mechanism portion 35 engages with the locking portion 31*f*. In addition, the pressurizing member 36*a* is movable forward and backward in the direction along the straight line orthogonal to the center axis of the male screw portion 31*d* to the base portion 33*a*.

The spring member 36*b* is a spring made of rubber or a metal. The spring member 36*b* generates energizing force to press the pressurizing member 36*a* toward the outer peripheral surface 31*g* of the locking portion 31*f*. That is, the spring member 36*b* generates the energizing force to push the pressurizing member 36*a* in the direction of approaching the center axis of the male screw portion 31*d*.

FIG. 8 illustrates the state that the pressurizing member 36*a* is in contact with the outer peripheral surface 31*g* of the locking portion 31*f*, and FIG. 9 illustrates the state that the pressurizing member 36*a* is separated from the outer peripheral surface 31*g* of the locking portion 31*f*.

As illustrated in FIG. 8, in the state that the falling prevention mechanism portion 35 engages with the locking portion 31*f*, by pressing the pressurizing member 36*a* to the outer peripheral surface 31*g* of the locking portion 31*f* by the energizing force of the spring member 36*b*, the position around the center axis of the male screw portion 31*d* to the adaptor 31 of the holding portion 33 is fixed.

In addition, the position fixing mechanism portion 36 includes a release button 36*c*. The release button 36*c* is a push button projected from the base portion 33*a*. The release button 36*c* includes a cam 36*d* that moves the pressurizing member 36*a* in the direction of separating from the outer peripheral surface 31*g* of the locking portion 31*f* in the case of being pushed in by a finger of a user. Thus, as illustrated in FIG. 9, in the state that the release button 36*c* is pushed in, since the pressurizing member 36*a* is separated from the outer peripheral surface 31*g* of the locking portion 31*f*, the holding portion 33 can turn around the center axis of the male screw portion 31*d* to the adaptor 31.

Note that, on the cross section illustrated in FIG. 8 and FIG. 9, a space portion SP where the locking portion 31*f* is fitted inside the position fixing mechanism portion 36 is formed in a roughly arc shape, however, the shape of the space portion SP may be a rectangular parallelepiped shape or the like.

In the present embodiment illustrated in FIG. 8 and FIG. 9, the inner peripheral surface 31*h* of the locking portion 31*f* is a cylindrical surface of a radius R1 centering on the optical axis O, and the outer peripheral surface 31*g* of the locking portion 31*f* is a cylindrical surface of a radius R2 centering on the optical axis O.

Then, the contact portion 33*b* to be in contact with the inner peripheral surface 31*h* of the locking portion 31*f* includes a contact surface 33*bb* which is a curved surface of a radius R3 larger than the radius R1 of the inner peripheral surface 31*h*. The contact portion 33*b* is in contact with the inner peripheral surface 31*h* of the locking portion 31*f* on the contact surface 33*bb*. Note that the contact surface 33*bb* may be a plane. When the contact surface 33*bb* and the inner peripheral surface 31*h* are in contact, the contact surface 33*bb* is in contact with the inner peripheral surface 31*h* at both end portions (parts indicated by P1 and P2 in FIG. 8 and FIG. 9) in the circumferential direction of the contact surface 33*bb*.

In addition, in the present embodiment, the pressurizing member 36*a* to be in contact with the outer peripheral surface 31*g* of the locking portion 31*f* includes a pressurizing surface P3, the surface of which is formed of a rubber material. The pressurizing surface P3 is a curved surface of a radius R4 roughly same as the radius R2 of the outer peripheral surface 31*g*. In the case that the pressurizing surface P3 of the pressurizing member 36*a* is in contact with the outer peripheral surface 31*g* of the locking portion 31*f*, as illustrated in FIG. 8, the pressurizing surface P3 is in close contact with the outer peripheral surface 31*g* over the almost entire circumferential direction. Note that the pressurizing surface P3 of the pressurizing member 36*a* may be a curved surface of a radius different from the radius R2 of the outer peripheral surface 31*g*, or may be a plane.

In the state illustrated in FIG. 8, the position fixing mechanism portion 36 is in contact with the locking portion 31*f* at at least three or more points that are P1 and P2 of the contact surface 33*bb* and the pressurizing surface P3 of the pressurizing member 36*a*. In the present embodiment, when the space portion SP is formed wide in the direction orthogonal to the optical axis O, even in the case that the radius R1 of the inner peripheral surface 31*h* and the radius R2 of the outer peripheral surface 31*g* change, the locking portion 31*f* can be arranged inside the space portion SP. That is, in the present embodiment, the position fixing mechanism portion 36 can be made to engage with the locking portion 31*f* of the adaptor 31 of a different outer diameter.

By the configuration described above, the holding portion 33 fixes the support base 32 at the arbitrary position around the center axis of the male screw portion 31*d* to the adaptor 31. Then, since the support base 32 is provided with the accessory shoe 34, by making the engaging portion 11*c* of the illumination device 11 engage with the accessory shoe 34, the illumination device 11 is fixed to the adaptor 31.

Thus, the adaptor system 30 of the present embodiment can fix one or a plurality of illumination devices 11 to the female screw portion of the image pickup apparatus 1 or the lens 2. In addition, since the adaptor system 30 of the present embodiment can move the holding portion 33 to the arbitrary position around the center axis of the male screw portion 31*d* of the adaptor 31, a fixing position of the illumination device 11 can be changed to the arbitrary position in the circumferential direction centering on the optical axis O of the lens 2.

In addition, the support base 32 includes a plane portion 32*a* turning to the direction roughly parallel with the optical axis O and separating from the optical axis O at a position more in front than the accessory shoe 34 and closer to the optical axis O than the accessory shoe 34. On the plane portion 32*a*, a recessed portion 32*b* is formed.

According to the adaptor system 30 including the configuration described above, when the plurality of adaptors 31 including the male screw portions 31*d* of the different nominal diameters are prepared, the illumination device 11 can be fixed to the image pickup apparatus 1 or the lens 2 including the female screw portion of the different nominal diameter. Note that, between the male screw portion 31*d* of the adaptor 31 and the female screw portion provided in the image pickup apparatus 1 or the lens 2, an intermediate member such as a step-up ring or a step-down ring may be interposed. In addition, an outer shape in the case of viewing from the direction along the optical axis O of the flange portion 31*b* of the adaptor 31 is not limited to a circular shape, and may be a rectangular shape or an elliptic shape.

Next, the diffuser 14 and the configuration for mounting the diffuser 14 of the illumination device 11 will be described.

As illustrated in FIG. 3 and FIG. 4, on two parts intersecting with the turning axis 11*d* on an outer surface of the illumination device 11, end face portions 11*e* respectively turning opposite directions along the turning axis 11*d* are provided. That is, an outer shape dimension of the illumination device 11 in the direction along the turning axis 11*d* at a part where the turning axis 11*d* passes through is a distance between a pair of end face portions 11*e*.

On each of the pair of end face portions 11*e*, a recessed portion 11*m* is formed. The recessed portion 11*m* is a circular hole roughly centering on the turning axis 11*d*. A pair of recessed portions 11*m* are opened toward the opposite directions along the turning axis 11*d*. The pair of recessed portions 11*m* are portions to which projections 14*c* provided on the diffuser 14 are to be fitted.

Figure 10:
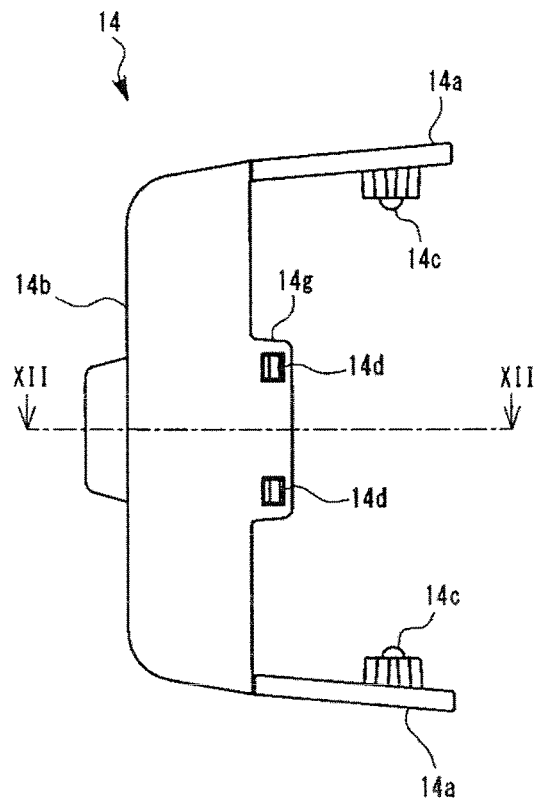
FIG. 10 is a diagram illustrating an appearance of a diffuser.
Figure 11:
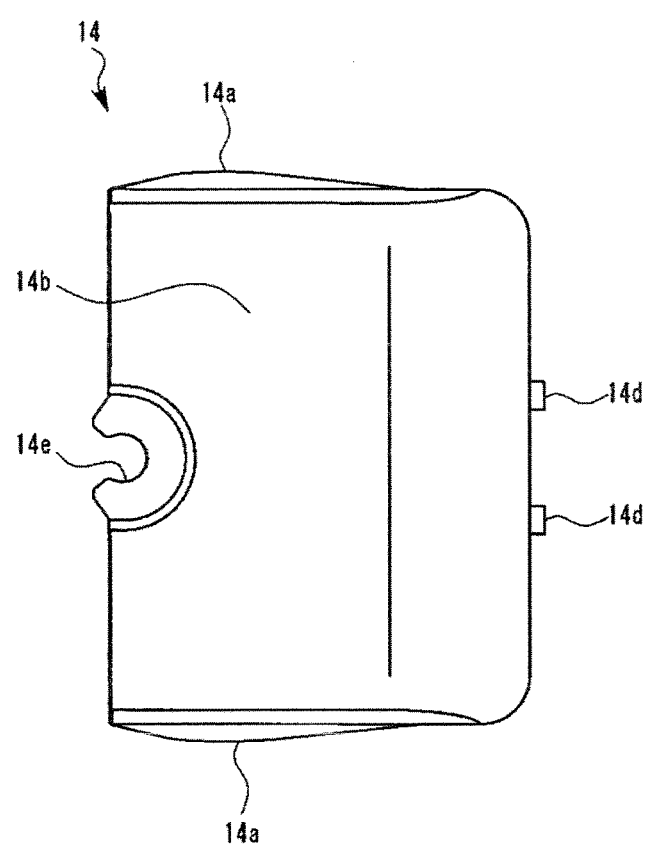
FIG. 11 is a diagram illustrating the appearance of the diffuser.
Figure 12:
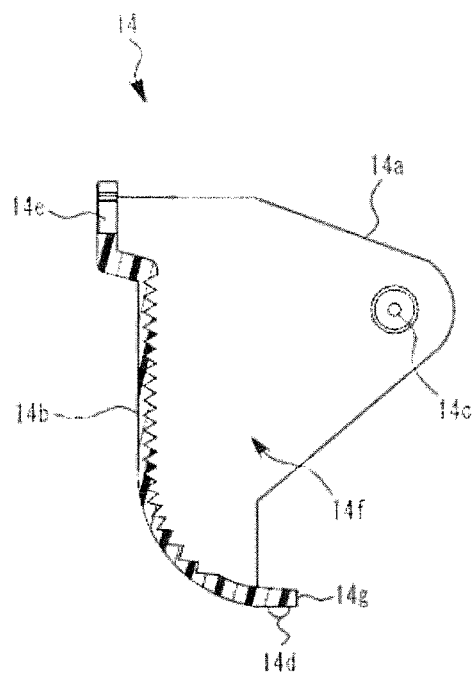
FIG. 12 is a XII-XII sectional view of FIG. 10.
Figure 13:
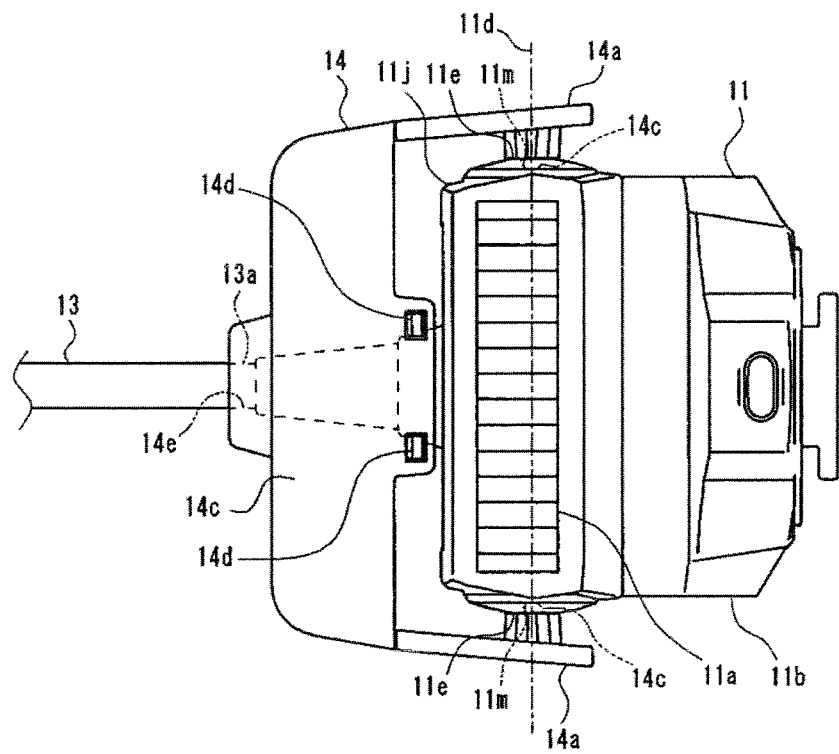
FIG. 13 is a diagram viewing the illumination device mounted with the diffuser from the front.
Figure 14:
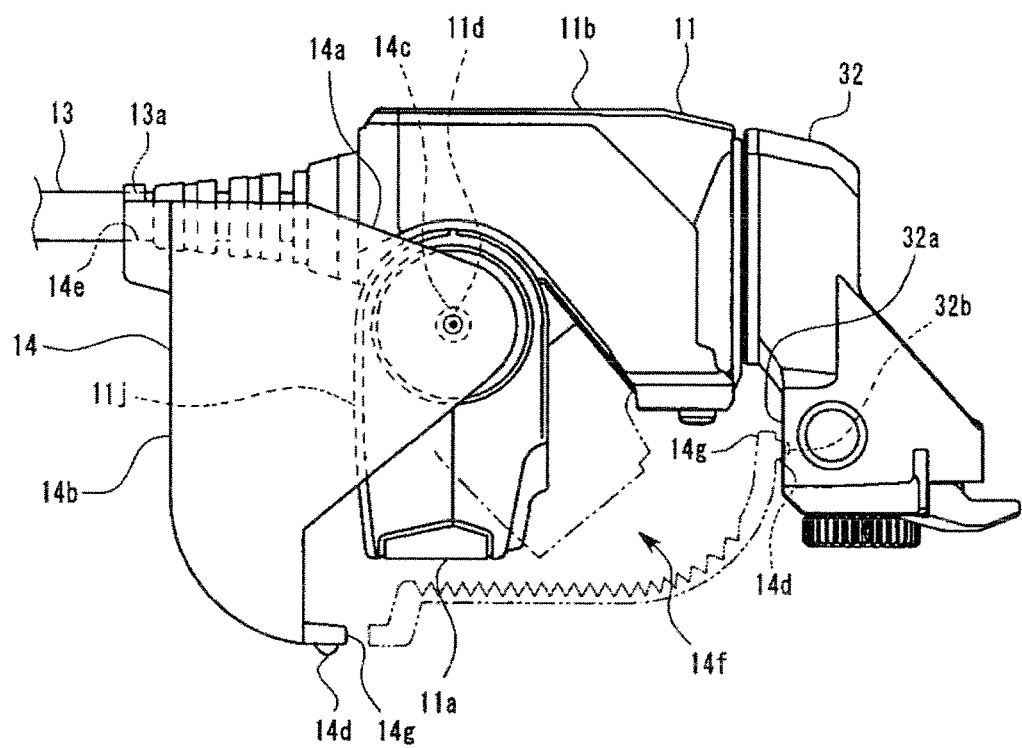
FIG. 14 is a diagram viewing the illumination device mounted with the diffuser and the illumination device support base from a direction along the turning axis.

FIG. 10 and FIG. 11 are diagrams illustrating an appearance of the diffuser 14. In addition, FIG. 12 is a XII-XII sectional view of FIG. 10. FIG. 13 is a diagram viewing the illumination device 11 mounted with the diffuser 14 from the front. FIG. 14 is a diagram viewing the illumination device 11 mounted with the diffuser 14 and the support base 32 from the direction along the turning axis.

The diffuser 14 is formed of an acrylic resin or a polycarbonate resin that is a synthetic resin, and includes a pair of arm portions 14*a*, a light transmitting portion 14*b*, a pair of projections 14*c*, a first locking portion 14*d* and a second locking portion 14*e*. In the present embodiment, as one example, the diffuser 14 is an integrally molded article of a transparent or translucent synthetic resin that transmits visible light. Note that the diffuser 14 may be formed by assembling a plurality of parts. In addition, in the present embodiment, as one example, the diffuser 14 is formed of a light-diffusive opalescent polycarbonate resin.

The pair of arm portions 14*a* are a pair of planar portions arranged to face each other, and hold the pair of end face portions 11*e* of the illumination device 11 in between. The pair of arm portions 14*a* are connected by the light transmitting portion 14*b*. The pair of arm portions 14*a* and the light transmitting portion 14*b* form a roughly U shape. The pair of arm portions 14*a* are elastically deformable.

On the surfaces facing each other of the pair of arm portions 14*a*, the projection 14*c* is formed respectively. The separation distance of the pair of projections 14*c* is shorter than the distance between the pair of end face portions 11*e*. Therefore, in the case that the pair of arm portions 14*a* hold the pair of end face portions 11*e*, the projections 14*c* are fitted inside the recessed portions 11*m* provided on the pair of end face portions 11*e* by utilizing the elasticity. By the pair of projections 14*c* being fitted inside the recessed portions 11*m* provided on the illumination device 11, the positions where the pair of arm portions 14*a* hold the pair of end face portions 11*e* is determined. In addition, by elastically deforming the pair of arm portions 14*a* so as to separate the end portions of each other, the diffuser 14 can be detached from the illumination device 11.

Furthermore, the projection 14*c* is turnable around the turning axis 11*d* inside the recessed portion 11*m*. Thus, the pair of arm portions 14*a* are relatively turnable around the turning axis 11*d* in relation to the illumination device 11 in the state of holding the pair of end face portions 11*e*. Note that, for the projection 14*c* and the recessed portion 11*m*, a relation of recessed and projected shapes may be opposite.

That is, a recessed portion may be provided on each of the pair of arm portions 14*a* of the diffuser 14 and a projection may be provided on each of the pair of end face portions 11*e*.

As illustrated in FIG. 14, by the pair of arm portions 14*a* relatively turning around the turning axis 11*d* in relation to the illumination device 11, the diffuser 14 swings between the advanced position where the light-diffusive light transmitting portion 14*b* is positioned in front of the light emitting portion 11*a* and a withdrawn position where the light transmitting portion 14*b* is withdrawn from the front of the light emitting portion 11*a*.

In a swinging range of the diffuser 14, a position where the light transmitting portion 14*b* is closest to the optical axis O is the advanced position. In FIG. 14, the diffuser 14 moved to the advanced position is illustrated with a two-dot chain line. In addition, in the swinging range of the diffuser 14, a position where the light transmitting portion 14*b* is most separated from the optical axis O is the withdrawn position. A swing angle of the diffuser 14 between the advanced position and the withdrawn position is about 90 degrees. The swing angle does not always need to be 90 degrees, and may be over 90 degrees or may be less than 90 degrees.

Between the light transmitting portion 14*b* and the swing portion 11*j*, a space portion 14*f* for avoiding interference of both is provided. Therefore, the light transmitting portion 14*b* and the swing portion 11*j* provided with the light emitting portion 11*a* are respectively independently turnable around the turning axis 11*d* to the main body portion 11*b*. Thus, the swing portion 11*j* and the diffuser 14 can mutually independently turn, and since the relation of the light transmitting portion 14*b* and emitted light changes, a range of irradiation light transmitted through the light transmitting portion 14*b* and diffusibility can be changed. As a result, a photographed picture can be also changed. In addition, in a turning range of the swing portion 11*j*, the light emitting portion 11*a* is covered with the diffuser 14 on an optical axis side of the advanced position so that the light can be diffused to a lens close distance in close-up photographing (macro photographing). A covered part of the light emitting portion 11*a* is an arc shape in the present embodiment, however, the covered part may be box-shaped or a slope face and the shape is not limited.

In the case that the light transmitting portion 14*b* is positioned at the advanced position, no matter at which position the swing portion 11*j* is, the light transmitting portion 14*b* is present between the light emitting portion 11*a* and the object. Thus, the illumination light emitted from the light emitting portion 11*a* is diffused when the light is transmitted through the light transmitting portion 14*b*. On the other hand, in the case that the light transmitting portion 14*b* is positioned at the withdrawn position, the entire light transmitting portion 14*b* is positioned at the position farther from the optical axis O than the light emitting portion 11*a*. Note that, while recesses and projections for diffusing the transmitting light are provided on the surface of the light transmitting portion 14*b* in the present embodiment, the surface of the light transmitting portion 14*b* may be flat.

In the state that the diffuser 14 is at the advanced position, at the portion closest to the optical axis O of the light transmitting portion 14*b*, the first locking portion 14*d* is formed. The first locking portion 14*d* holds the diffuser 14 at the advanced position by engaging with the support base 32 in the state that the diffuser 14 is at the advanced position.

The first locking portion 14*d* is a projected portion or a recessed portion provided in a flexurally deformable elastic part of the light transmitting portion 14b, and engages with a recessed portion or a projected portion provided in the support base 32.

In the present embodiment, as one example, the light transmitting portion 14b includes a tongue piece portion 14g that faces the plane portion 32a of the support base 32 in the state that the diffuser 14 is at the advanced position. Then, the first locking portion 14d is the projected portion projected from the tongue piece portion 14g toward the plane portion 32a in the state that the diffuser 14 is at the advanced position. The first locking portion 14d engages with the recessed portion 32b provided on the plane portion 32a in the state that the diffuser 14 is at the advanced position.

The second locking portion 14e engages with a portion near the base portion 13a of the cable 13 in the state that the diffuser 14 is at the withdrawn position. The second locking portion 14e holds the diffuser 14 at the withdrawn position by engaging with the cable 13 in the state that the diffuser 14 is at the withdrawn position.

In the present embodiment, as one example, the second locking portion 14e is a horseshoe-shaped notch provided in the light transmitting portion 14b, and engages with the cable 13 by holding the cable 13 inside.

As described above, in the present embodiment, the diffuser 14 is easily attachable and detachable to/from the illumination device 11. In addition, in the present embodiment, in the state of mounting the diffuser 14 on the illumination device 11, by swinging the diffuser 14 around the turning axis 11d, an operation of selecting presence/absence of diffusion of the illumination light by the diffuser 14 can be easily executed. Furthermore, in the present embodiment, in the state of mounting the diffuser 14, the swing portion 11j provided with the light emitting portion 11a can be swung around the turning axis 11d without interfering with the diffuser 14.

Note that the present invention is not limited to the embodiment described above and can be appropriately modified without opposing the gist or idea of the invention read from the scope of claims and the entire description, and the illumination device system accompanied by such a modification is also included in the technical scope of the present invention.

What is claimed is:

1. An illumination device system comprising:
an illumination device support base including an accessory shoe; and
an illumination device including an engaging portion configured to engage with the accessory shoe, a main body portion to which the engaging portion is fixed, a swing portion capable of swinging around a turning axis in relation to the main body portion, a light emitting portion provided in the swing portion, a cable extending from the main body portion, and a diffuser,
wherein the diffuser is turnable relative to the main body portion around the turning axis, one end of a range of the turning is an advanced position where the diffuser is positioned in front of the light emitting portion, another end of the range of the turning is a withdrawn position where the diffuser is withdrawn from the front of the light emitting portion, and
the diffuser is provided with a first locking portion configured to engage with the illumination device support base and stop the turning of the diffuser in a case that the diffuser is at the advanced position, and a second locking portion configured to engage with the cable and stop the turning of the diffuser in a case that the diffuser is at the withdrawn position.

2. The illumination device system according to claim 1, wherein the first locking portion is a projected portion or a recessed portion provided in an elastically deformable part provided in the diffuser, and engages with a recessed portion or a projected portion provided in the illumination device support base.

3. The illumination device system according to claim 1, wherein the second locking portion is a horseshoe-shaped notch provided in the diffuser and configured to hold the cable inside.

4. The illumination device system according to claim 1, wherein the diffuser is formed of an opalescent polycarbonate resin.

5. The illumination device system according to claim 1, wherein the diffuser is detachable from the turning axis.

6. The illumination device system according to claim 1, wherein the diffuser includes a diffusive light transmitting portion.

7. The illumination device system according to claim 1, wherein the cable is for the illumination device to receive power supply from a power source device.

8. The illumination device system according to claim 2, wherein the second locking portion is a horseshoe-shaped notch provided in the diffuser and configured to hold the cable inside.

9. An illumination device system comprising:
an illumination device including a main body portion, a swing portion capable of swinging around a turning axis in relation to the main body portion, a light emitting portion provided in the swing portion, and a cable extending from the main body portion; and
a diffuser turnable relative to the main body portion around the turning axis, wherein one end of a range of the turning is an advanced position positioned in front of the light emitting portion and another end of the range of the turning can be positioned at a withdrawn position withdrawn from the front of the light emitting portion, and including a first locking portion configured to engage with an illumination device support base supporting the illumination device and stop the turning in a case of being at the advanced position, and a second locking portion configured to engage with the cable and stop the turning of the diffuser in a case of being at the withdrawn position.

10. The illumination device system according to claim 9, wherein the first locking portion is a projected portion or a recessed portion provided in an elastically deformable part provided in the diffuser, and engages with a recessed portion or a projected portion provided in the illumination device support base.

11. The illumination device system according to claim 9, wherein the second locking portion is a horseshoe-shaped notch provided in the diffuser and configured to hold the cable inside.

12. The illumination device system according to claim 10, wherein the second locking portion is a horseshoe-shaped notch provided in the diffuser and configured to hold the cable inside.

13. An illumination device system comprising:
an illumination device including an engaging portion configured to engage with an accessory shoe provided in an illumination device support base, a main body portion to which the engaging portion is fixed, a swing portion capable of swinging around a turning axis in relation to the main body portion, a light emitting portion provided in the swing portion, and a cable extending from the main body portion; and a diffuser turnable relative to the main body portion around the turning axis, wherein one end of a range of the turning is an advanced position positioned in front of the light emitting portion and another end of the range of the turning can be positioned at a withdrawn position withdrawn from the front of the light emitting portion, including a first locking portion configured to engage with the illumination device support base and stop the turning in a case of being at the advanced position, and a second locking portion configured to engage with the cable and stop the turning of the diffuser in a case of being at the withdrawn position, and attachable and detachable to/from the illumination device.

14. The illumination device system according to claim 13, wherein the first locking portion is a projected portion or a recessed portion provided in an elastically deformable part provided in the diffuser, and engages with a recessed portion or a projected portion provided in the illumination device support base.

15. The illumination device system according to claim 13, wherein the second locking portion is a horseshoe-shaped notch provided in the diffuser and configured to hold the cable inside.

16. The illumination device system according to claim 13, wherein the diffuser is formed of an opalescent polycarbonate resin.

17. The illumination device system according to claim 13, wherein the diffuser is detachable from the turning axis.

18. The illumination device system according to claim 13, wherein the diffuser includes a diffusive light transmitting portion.

19. The illumination device system according to claim 13, wherein the cable is for the illumination device to receive power supply from a power source device.

20. The illumination device system according to claim 14, wherein the second locking portion is a horseshoe-shaped notch provided in the diffuser and configured to hold the cable inside.

* * * * *